United States Patent
Lenihan et al.

(10) Patent No.: US 11,341,703 B2
(45) Date of Patent: May 24, 2022

(54) METHODS AND SYSTEMS FOR GENERATING AN ANIMATION CONTROL RIG

(71) Applicant: Weta Digital Limited, Wllington (NZ)

(72) Inventors: Niall J. Lenihan, Wellington (NZ); Sander van der Steen, Wellington (NZ); Richard Chi Lei, Wellington (NZ); Florian Deconinck, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

(21) Appl. No.: 17/118,479

(22) Filed: Dec. 10, 2020

(65) Prior Publication Data

US 2022/0028144 A1    Jan. 27, 2022

Related U.S. Application Data

(60) Provisional application No. 63/056,429, filed on Jul. 24, 2020.

(51) Int. Cl.
*G06T 13/40* (2011.01)
*G06T 7/246* (2017.01)
(Continued)

(52) U.S. Cl.
CPC ............... *G06T 13/40* (2013.01); *G06N 3/08* (2013.01); *G06T 7/251* (2017.01); *G06T 7/254* (2017.01);
(Continued)

(58) Field of Classification Search
CPC ......... G06T 13/40; G06T 7/254; G06T 7/251; G06T 2207/20081; G06T 2207/20084; G06N 3/08
See application file for complete search history.

(56) References Cited

U.S. PATENT DOCUMENTS

| 9,489,759 B1 | 11/2016 | Gregory |
| 2009/0091563 A1 | 4/2009 | Viz |

(Continued)

FOREIGN PATENT DOCUMENTS

| EP | 3358527 A | 8/2018 |

OTHER PUBLICATIONS

Bhali, Zeeshan, et al. "Template based procedural rigging of quadrupeds with custom manipulators." 2013 International Conference on Advanced Computer Scienve Applications and Technologies. IEEE, 2013.[Year: 2013].

(Continued)

*Primary Examiner* — Xilin Guo
(74) *Attorney, Agent, or Firm* — Trellis IP Law Group, PC

(57) ABSTRACT

An aspect provides a computer-implemented method for training controls for an animation control rig using a neural network. The method comprises receiving 502 a combination of training data, wherein the combination of training data includes a first set of training data derived from image capture poses of a physical object and a second set of training data derived from posing an animation version of the physical object; receiving 504 a set of coarse error data derived from a first training process of the combination of training data, the first training process comprising passing at least some of the combination of training data to the neural network as a sequence of training steps; determining 506 a rate of change of training errors associated with the coarse error data; in response to detecting 512 a rate of change of training errors that crosses a rate of change threshold, during a second processing of the combination of training data, varying 514 a learning rate over time based on a slope of the rate of change of training errors.

18 Claims, 9 Drawing Sheets

(51) Int. Cl.
*G06N 3/08* (2006.01)
*G06T 7/254* (2017.01)

(52) U.S. Cl.
CPC .............. *G06T 2207/20081* (2013.01); *G06T 2207/20084* (2013.01)

(56) References Cited

U.S. PATENT DOCUMENTS

| | | |
|---|---|---|
| 2011/0102424 A1 | 5/2011 | Hibbert |
| 2012/0210262 A1 | 8/2012 | Sheeler |
| 2015/0022517 A1 | 1/2015 | Jutan |
| 2016/0103828 A1 | 4/2016 | Woolf |
| 2018/0096259 A1* | 4/2018 | Andrews ................. G06T 7/251 |
| 2019/0325633 A1 | 10/2019 | Miller |
| 2020/0320764 A1 | 10/2020 | Bryson |
| 2020/0394806 A1* | 12/2020 | Payne ..................... G06T 19/20 |
| 2021/0233300 A1* | 7/2021 | Borer ..................... G06N 20/00 |

OTHER PUBLICATIONS https://www.indefiant.com—Indefiant Recode—5 pages.
https://www.liveplusplus.tech—Live++—7 pages.

* cited by examiner

METHODS AND SYSTEMS FOR GENERATING AN ANIMATION CONTROL RIG

CROSS REFERENCES TO RELATED APPLICATIONS

This application claims the benefit of U.S. Provisional Patent Application Ser. No. 63/056,429, entitled SYSTEM USING CONTROL DATA FOR MATCHING TO AN ANIMATION CONTROL RIG, filed on Jul. 24, 2020, which is hereby incorporated by reference as if set forth in full in this application for all purposes.

FIELD

The present disclosure generally relates to methods and systems for generating an animation control rig configured to manipulate a skeleton of an animated character.

BACKGROUND

Visual content generation systems are used to generate imagery in the form of still images and/or video sequences of images. The still images and/or video sequences of images include live action scenes obtained from a live action capture system, computer generated scenes obtained from an animation creation system, or a combination thereof.

An animation artist is provided with tools that allow them to specify what is to go into that imagery. Where the imagery includes computer generated scenes, the animation artist may use various tools to specify the positions in a scene space such as a three-dimensional coordinate system of objects. Some objects are articulated, having multiple limbs and joints that are movable with respect to each other.

The animation artist may retrieve a representation of an articulated object and generate an animation sequence movement of the articulated object, or part thereof. Animation sequence data representing an animation sequence may be stored in data storage, such as animation sequence storage described below.

Animation sequence data might be in the form of time series of data for control points of an articulated object having attributes that are controllable. Generating animation sequence data has the potential to be a complicated task when a scene calls for animation of an articulated object.

SUMMARY

Embodiments generally relate to using motion-capture ("mocap") data of a human actor moving about a scene in real time to later control an animation "rig" of a character model. The character model may differ, for example, in structure, size or arrangement from that of the human actor. The rig may be, for example, a model of a gorilla, giant, ogre, cat or any other creature or structure for which a computer model with articulating limbs or other parts has been created. Given that the mocap data is captured from a human's skeletal structure and joint/limb configuration that can be very different from the rig, it is often difficult to match the human actor's data to control the rig's components in order to animate the rig in a manner that looks natural or artistically desirable.

An animation system assists a human animator ("user") by providing an automated matching, or correspondence, of mocap data to "control points" on the rig. However this automated mapping process is complex and difficult to achieve. Also, since a desired animation can be targeted to subjective human perception, the methods used to achieve the desired mappings use "machine learning" techniques whereby a software system is "trained" with human-generated target data to generate matchings, or "mappings," that result in desirable animations.

This training process may take a relatively long time to achieve desired results. For example, many minutes or hours (or longer) might be required. If the data or rig is substantially changed (e.g., a different actor's actions are swapped in, the rig is changed, a director doesn't like the results, etc.) it is often necessary to re-train the system. Often there isn't enough time to do the retraining given the constraints of movie and television production schedules. Various features described herein provide for efficient training, or retraining. Although examples using motion capture data and animation rigs are provided, some features may be useful in applications using other types of data and other types of outputs.

In accordance with an aspect, A computer-implemented method for training a computer system to use motion capture data to animate an animation control rig describing a model in a plurality of poses. The method includes receiving training data, the training data including motion capture data associated with a target animation sequence; selecting parameters; generating a test animation sequence from the training data by using a matching system configured with the selected parameters; determining an error value by comparing the test animation sequence to the target animation sequence and accumulating positional differences of corresponding components at multiple poses; generating a set of error values by repeating the above steps of selecting, generating and determining, wherein each iteration of selecting parameters varies at least one parameter by a step amount; analyzing the set of error values to identify a group of two or more error values that decrease more than a predetermined rate threshold; identifying parameters used to generate the identified group of error values; using a smaller step amount to vary one or more of the identified parameters in a second sequence of selecting, generating and determining, until a lower error value is found; and using the selected parameters corresponding to the lower error value to configure the matching system to use the motion capture data to animate the animation control rig.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment the method further comprises employing an initial training setting of one type of member of the model to set an initial state of training for another type of member of the model.

In an embodiment, the method further comprises, wherein the training data is derived at least in part using forward kinematics.

In an embodiment, the method further comprises, wherein the training data is derived at least in part using inverse kinematics.

In an embodiment, the method further comprises, wherein determining the decrease in error values includes analyzing a rate of change of error values from the output of a neural network.

In an embodiment, the method further comprises, wherein the decreasing the step amount is based on the slope of the rate of change of error values.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described below are methods and systems for generating an animation control rig configured to manipulate a skeleton of an animated character.

Figure 1:
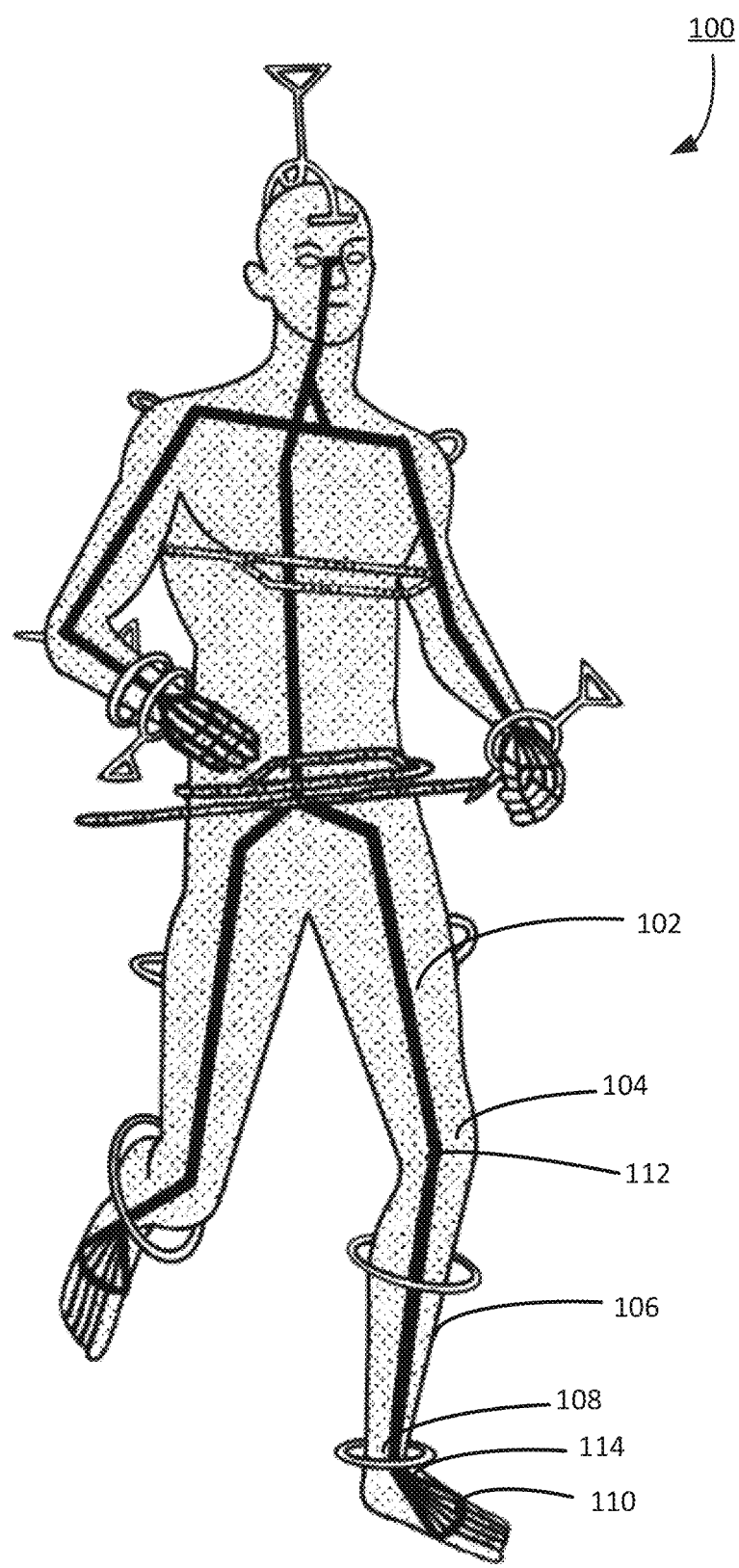
FIG. 1 shows an example of a control rig configured to enable an artist to create animation sequence data.

FIG. 1 shows an example of a control rig 100, or animated skeleton. Control rig 100 is configured to enable an artist to create animation sequence data. Animation sequence data is typically in the form of time series of data for control points of an object that has attributes that are controllable. In some examples the object includes a humanoid character with limbs and joints that are movable in manners similar to typical human movements.

Here, control rig 100 represents a humanoid character, but may be configured to represent a plurality of different characters. In an embodiment control rig 100 includes a hierarchical set of interconnected bones, connected by joints forming a kinematic chain.

For example, control rig 100 includes thigh 102, knee 104, lower leg 106, ankle 108, and foot 110, connected by joints 112, 114. Control rig 100 may be employed to individually move individual bones and joints using forward kinematics to pose a character. Moving thigh 102 causes a movement of lower leg 106, as lower leg 106 is connected to thigh 102 via knee 104. Thigh 102 and lower leg 106, for example, are in a parent-child relationship. Movement of lower leg 106 is a product of movement of thigh 102 as well as movement of lower leg 106 itself. Control rig 100 may also use inverse kinematics, in which an artist moves ankle 108 for example. If an artist moves ankle 108 upwards, knee 104 consequently bends and moves upwards to accommodate a pose in which ankle 108 is at a user specified location.

Control rig 100 may be formed using a plurality of data points. Control rig 100 may be matched to a skeleton obtained from an animation system, or from, for example, motion capture markers on real-life actors or obtained by other means. A live action scene of a human actor can be captured by live action capture system 902 (see FIG. 9) The movement of fiducials, such as markers affixed to the actor's clothing, is determined by live action processing system 922. Animation driver generator 944 may convert that movement data into specifications of how joints of an articulated character are to move over time.

Figure 2:
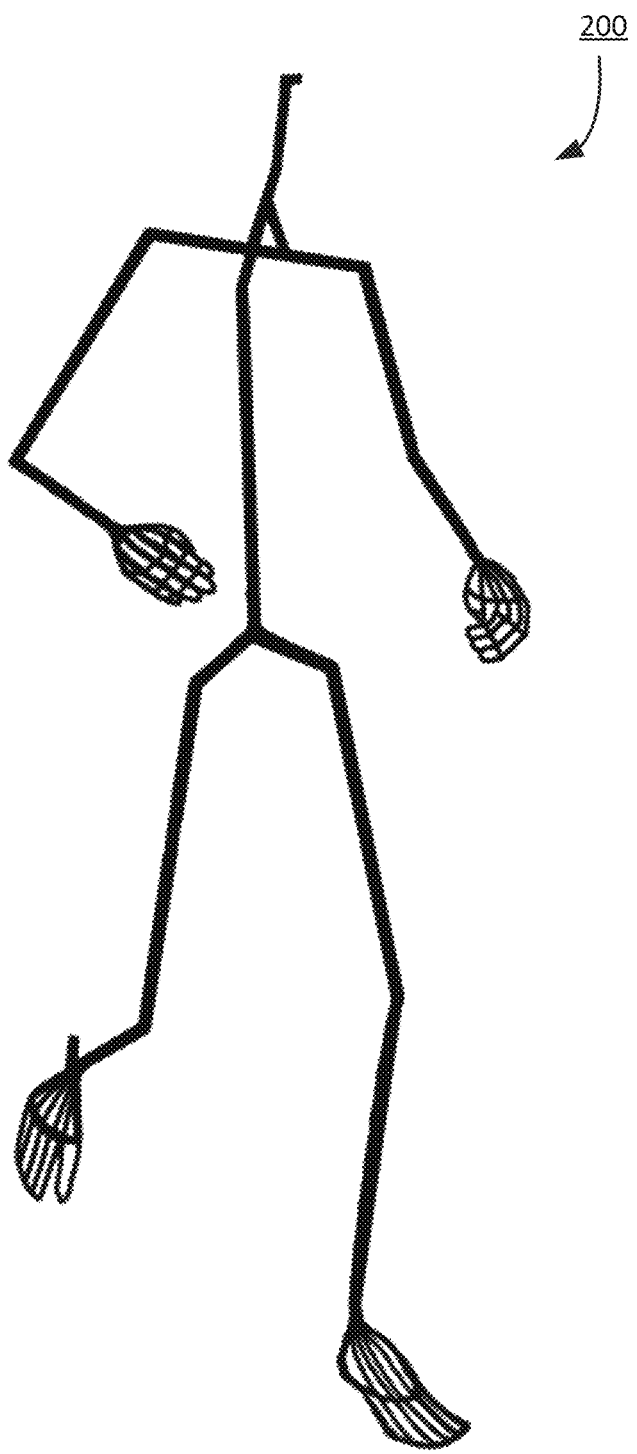
FIG. 2 shows an example of a skeleton obtained from an animation system that is matched to the skeleton of the control rig of FIG. 1.

FIG. 2 shows an example of a skeleton 200 obtained from an animation system such as visual content generation system 900.

The motions of control rig 100 are able to correspond to the motions of motion captured skeleton 200 when matched. Control rig 100 may also be controlled freely by an animator to produce motions beyond the motions of a real-life skeleton (such as the real-life skeleton of a human). Control rig 100 may represent a character of a different size to the skeleton of a real-life actor.

Figure 3:
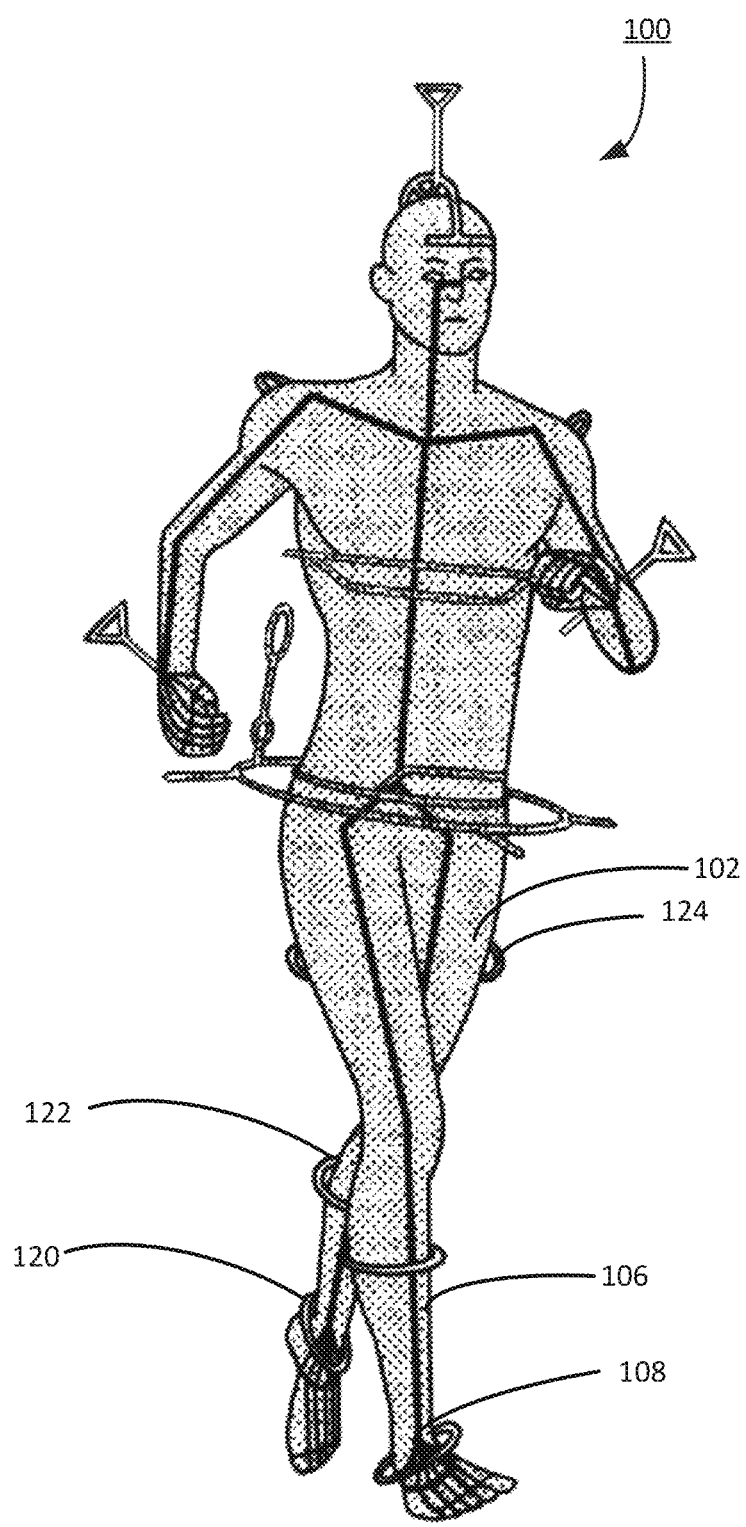
FIG. 3 shows examples of animation control points associated with the control rig of FIG. 1.

As shown in FIG. 3, control rig 100 includes a plurality of animation control points. Examples of control points are indicated at 120, 122 and 124 respectively. For example, in an embodiment control rig 100 includes control point 120 at the ankle that allows an animator to control the motion of a leg of control rig 100. In another example, control point 122 is positioned at lower leg 106 of rig 100 and/or control point 124 is positioned at thigh 102. Different parts of the control rig 100 have associated to them respective control points.

In an embodiment, an artist may create an animation sequence by selecting a control point on control rig 100. Control rig 100 may be displayed, for example, on display 812 (see FIG. 8). The artist selects a control point using input device 814 and/or cursor 816. The control points may be displayed as extending from a character represented by control rig 100. Displaying the control points in this manner enables the artist to select a control point easily.

In an embodiment, operating animation control(s) causes an animated object to be generated. The animated object may be displayed, for example, on display 812 as an image sequence.

The artist may, for example, select control point 122 for the lower leg or control point 124 for the upper leg of control rig 100. The artist can change positions and/or locations of control points to define a "key frame." That is, a configuration and position for the character to assume at a specific point in time. This process of defining key frames is known as key-framing. The artist moves controls to new positions at given times, thereby creating key poses in an animation sequence. Interpolation is performed between key poses.

In an embodiment, control points may be used to control more than one bone, joint, etc. For example, a control point may be used to control the upper arm and lower arm at the same time.

In an embodiment, at least one inverse kinematics operation is performed in order to generate the animation sequence specified by the artist. For example, the artist may wish to specify that ankle 108 is to move from a location within control rig 100 shown in FIG. 1 to a location within control rig shown in FIG. 3. The artist manipulates control point 120 to specify a desired change in ankle location.

A series of calculations is performed to determine what changes in location and/or orientation of parts of control rig 100 are required to result in an orientation of control rig shown in FIG. 3. For example, the new location of control point 120 selected by the artist may require a change in location and/or orientation of at least thigh 102, knee 104, lower leg 106, ankle 108 and foot 110. The changes in location and/or orientation that are required to achieve a goal of the artist are then determined.

In an embodiment, the matching, or association, of movement of the mocap skeleton in FIG. 2 to the control points in the rig of FIG. 1 is automated by a machine learning approach. Ideally, the automated mapping and resulting mocap-controlled animation of the rig would result in a desired animation sequence and the work would be done. In cases where human interaction is needed to modify the automatically generated animation, the artist can perform manipulations to the control points or with other interface controls or tools.

Figure 4:
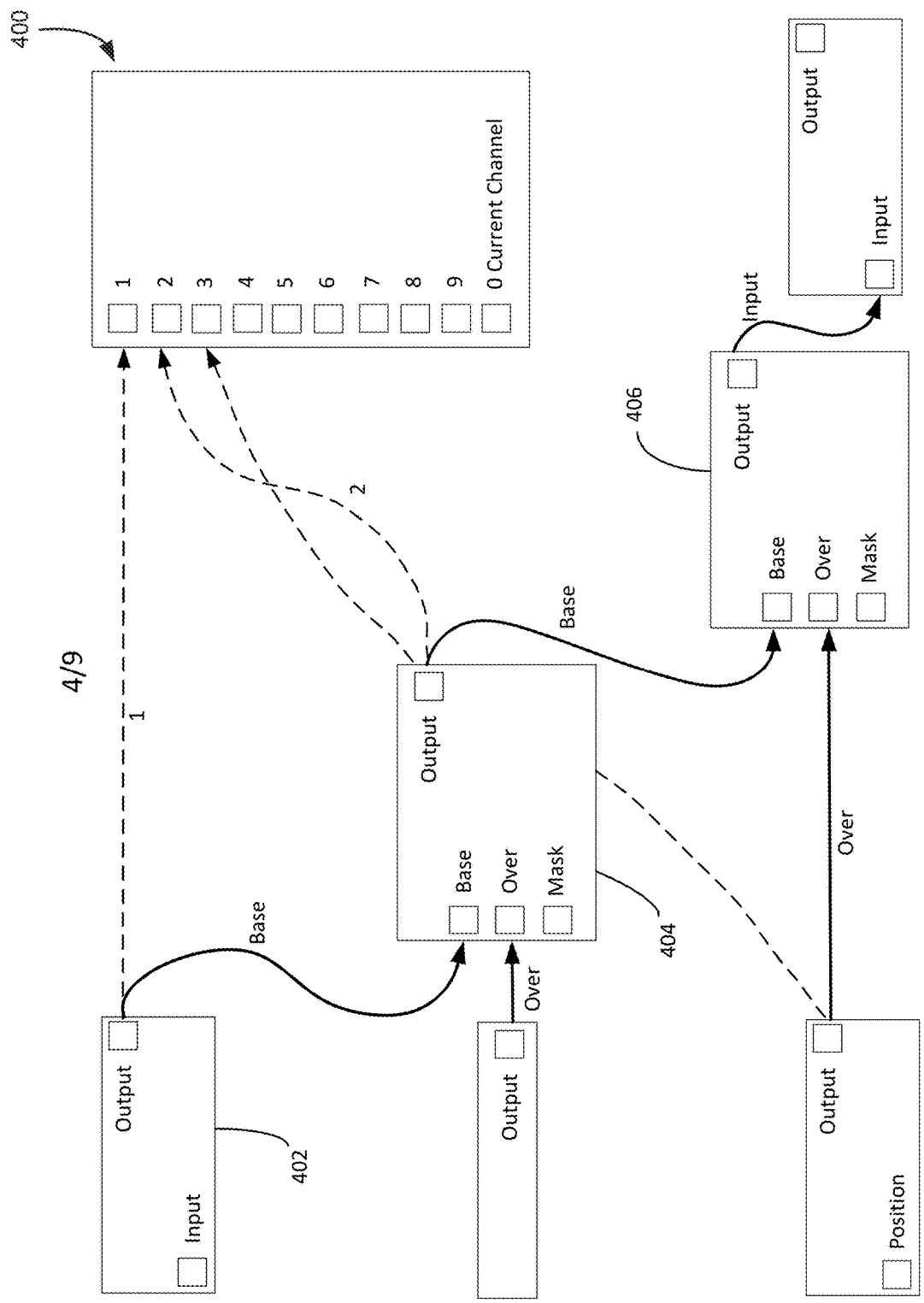
FIG. 4 shows an example of a hierarchical node graph suitable for implementing the control rig of FIG. 1.

FIG. 4 shows an example of a hierarchical node graph 400 suitable for implementing control rig 100 of FIG. 1. Node graph 400 includes a plurality of nodes, examples of which are shown at 402, 404 and 406 respectively. At least some of the nodes are associated with at least one input and at least one output.

In an embodiment one or more nodes of the hierarchical node graph 400 represent respective animation control points of control rig 100. Outputs from individual nodes include the solved positions of each joint angle and bone position in the kinematic chain. In inverse kinematics, the new joint angles and positions are determined relative to the control input. Inputs to the individual nodes include the new position of a member that is then used to calculate the position of the other members of the skeleton and the associated joint angles. For example, moving the hand from a first position resting on the ground to a new position above the ground will be used to determine the position of the forearm, upper arm, and elbow, and shoulder.

In an embodiment, at least one node in hierarchical node graph 400 is inversely solvable through an analytical approach. For example, node 404 has associated to it an inverse kinematics function. The artist selects a position and/or location of control point 120 that is different to the current position and/or location of the control point. Node 402 in hierarchical node graph 400 is identified as corresponding to control point 120. The inverse kinematics function associated to node 402 is applied to control point 120. The output of node 402 becomes an input to node 404. The output of node 404 then becomes the input of node 406.

The result is that the position and angle associated with each node further away from the control point allows the position and/or location of control point 120 to correspond to the position and/or location selected by the artist. In an example, a node that is inversely solvable may involve a problem that has three points of a limb that are analytically solvable using a single solution, such as a trigonometric solution.

In an embodiment at least one node in hierarchical node graph 400 is not inversely solvable through an analytical approach. For those nodes that are not inversely solvable, there is no associated inverse kinematics function. An inverse kinematics function cannot be applied to a control point so that the position and/or location of the control point corresponds to a position and/or location selected by the artist.

In an embodiment control rig 100 and hierarchical node graph 400 are subject to at least one constraint. For example, there may be a finite number of positions and/or orientations that an artist may select for knee 104. Some positions may violate physical constraints that apply to a physical skeleton associated to control rig 100. These physical constraints include biomechanical limitations of movement that apply to a physical skeleton and that are modelled by control rig 100.

Furthermore, some positions may involve applying transformations to at least one node in the hierarchical node graph 400 for which there is no associated inverse kinematics function. Such transformations violate a computational constraint. For example, there may be cases where a node does not have an inverse kinematics function.

In an embodiment, a series of forward kinematics operations are applied to at least one node in hierarchical node graph 400 for which there is no associated inverse kinematics function. The resulting location is compared to the desired location selected by the artist. Any difference in location is compared to a tolerance. If the difference is within the tolerance then the transformation is completed. On the other hand, if the difference in locations is outside the tolerance then a further forward kinematics operation is performed on the node with the intention of achieving a difference between the calculated location and the selected location that is within the tolerance.

In an embodiment, an iterative solve is required where there are overlapping solves associated with a change in a control node. It is possible that some nodes may have more than one associated inverse kinematics function related to multiple parent nodes. Most of the solves are based on trigonometry, so there may be more than one way to solve the equation.

Trigonometric solutions are generally directly solvable. A problem may arise where there are solves that require more than one solve at a time. For example, a solve may be straightforward to determine for a hand position, elbow position, and shoulder position if the hand was fixed relative to the forearm. In other words, a problem that involves three points of a limb is analytically solvable using a single trigonometric solution.

However, the artist may wish to, for example, bend a wrist back and then move the lower arm. There is a choice of trigonometric solutions. A first solution may involve the bent position of the hand, forearm, elbow, and upper arm. A second solution may involve the bent position of the hand and just the end of the forearm. In other words, when more than three points of a limb are involved in a problem, multiple trigonometric solutions involving the same points of a limb may exist. Approximation involving iterative solves may be required in such cases.

A control node selected by the artist may influence multiple parent nodes. The relationship between the control node and each of the multiple parent nodes has an associated inverse kinematics function. Therefore, a changed position and/or orientation of the control node would require multiple inverse kinematics functions to be solved iteratively to determine the positions and/or orientations of the multiple parent nodes.

In an example, when a series of movements of control rig 100 is required to match with a series of movements from a motion captured skeleton, the control points of control rig 100 are controlled by the corresponding positions of the motion captured skeleton. For example, an ankle of the motion captured skeleton drives a corresponding ankle of the control rig. The inverse kinematics operations associated with the ankle node of the control rig are then used to derive the positions and/or orientations of at least thigh 102, knee 104 and lower leg 106.

Figure 5:
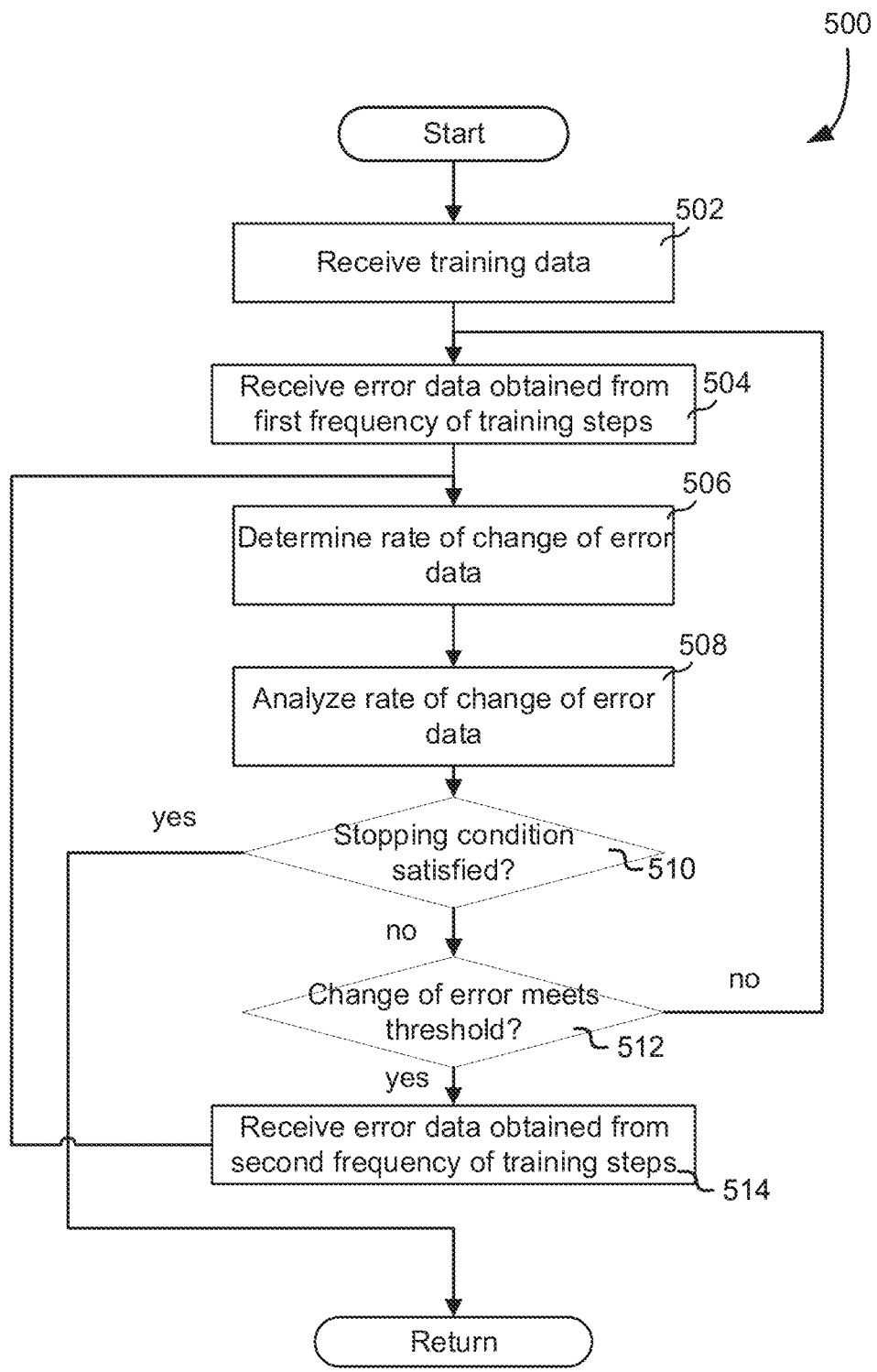
FIG. 5 shows an example method for training controls for the animation control rig of FIG. 1.

FIG. 5 shows an example method 500 for training controls for animation control rig 100 of FIG. 1. In an embodiment the training involves a neural network such as neural network 606 (see FIG. 6).

Method 500 includes receiving 502 a combination of training data to be used as input to neural network 606. The training data may include a first set of training data derived from motion capture data of a human actor, or other image capture poses of a physical object. The training data also includes a specification of desired mappings or alignment of control points between the training data and the rig. The training data can include forward kinematics and control data of the rig pose. The training data can be associated with a target animation sequence that has been selected by a human, or by other means, as the desired animation to be achieved.

As described in more detail below, live action capture system 902 (see FIG. 9) captures a live scene that plays out on a stage 904. Various devices such as video cameras 906(1) and 906(2), and sensors 908 capture information involving human actor(s), animal actor(s), inanimate object(s) and background object(s). Examples of sensors 908 include infrared cameras, infrared sensors and/or motion capture detectors.

Live action capture system 902 may output live action footage to live action footage storage 920. Live action processing system 922 may process live action footage to generate data about that live action footage and store that data into live action metadata storage 924.

In an embodiment the first set of training data is obtained from document storage such as live action footage storage 920 and/or live action metadata storage 924.

Visual content generation system 900 further includes animation creation system 930. Animation artists, managers, and others operate animation creation system 930 to:
- generate and output data representing objects to object storage 934,
- generate and output data representing a scene into scene description storage 936, and/or
- generate and output data representing animation sequences to animation sequence storage 938.

In an embodiment the second set of training data is obtained from document storage such as object storage 934, scene description storage 936 and/or animation sequence storage 938.

Figure 6:
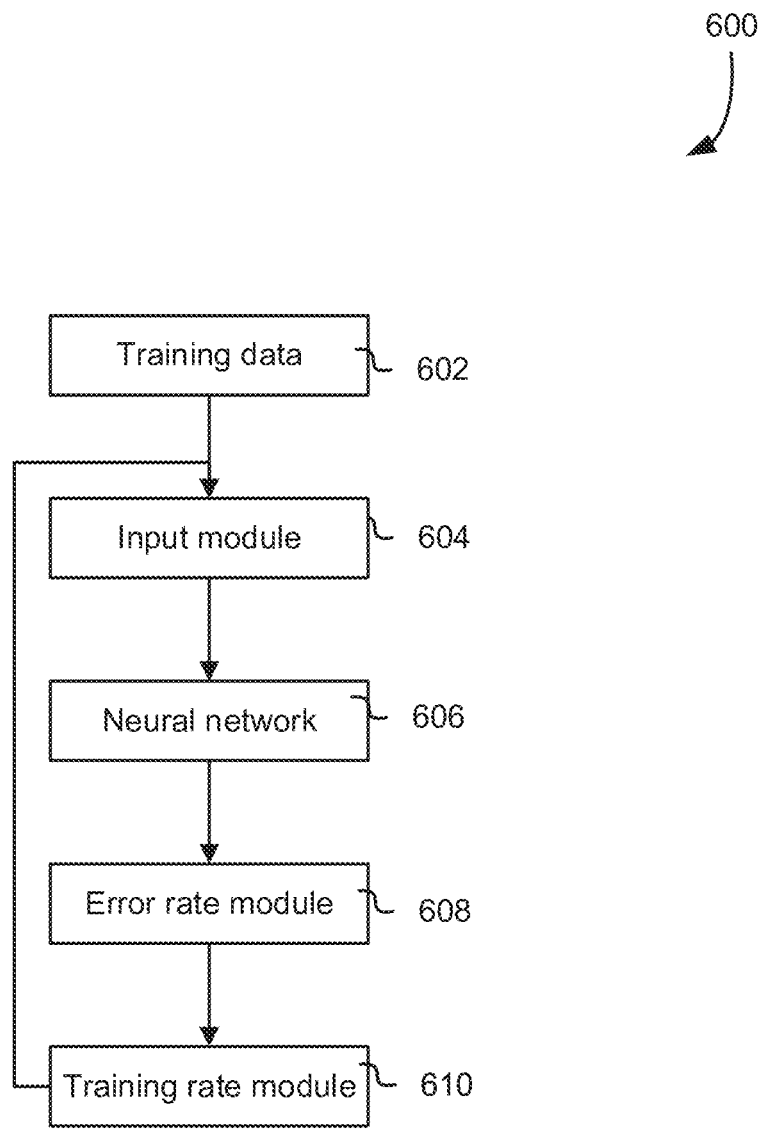
FIG. 6 shows an example of a system for training a neural network.

The combination of training data is input to a training network such as neural network 606 (see FIG. 6). Neural network 606 takes as input the combination of training data and generates a set of coarse error data. For example, outputs from neural network 606 may be compared against targets. Errors arising from differences between observed outputs and target outputs may be used to adjust, update or change connection weights within neural network 606 for training purposes. The error data includes, for example, errors obtained by running the neural network on the training data used to train the neural network. Lower error data values indicate a more accurate neural network.

Method 500 includes receiving 504 the coarse error data obtained from a training of the neural network. In an embodiment the training data is passed to neural network 606 as a sequence of training steps. In an embodiment, a training step includes inputting training sets to neural network 606, comparing the errors arising from differences between observed inputs and target outputs, and changing the connection weights. Changing connection weights can also be described as stepping or iterating through parameter changes as the changing connection weights are applied to selected parameters.

In an embodiment, updating the connection weights includes determining a direction to move the connection weights that will decrease the error values arising from a difference between an observed ("test animation") input and a target output. This direction is also referred to as a downhill direction or gradient descent. Updating the connection weights further includes moving some distance in the downhill direction. One way to determine an error value is to compare one or more poses between the test animation and target animation. The differences in pose pairs can be quantified by measurements of respective component positions in space, angle of components, etc. In other embodiments, other methods for determining an error value can be used.

Different embodiments can use different implementations of a gradient descent algorithm and different parameters, or their weights or other associated modifiers, may be varied. In one embodiment, any one or more of parameters for learning rate, momentum value, momentum type and decay rate values can be changed. Additionally, the gradient descent algorithm, itself, may be changed as a factor to affect the error values.

A learning rate is associated with how far in the downhill direction the connection weights are moved. A lower or smaller learning rate of training steps involves introducing a larger amount of training data at each training step and a higher learning rate of training steps involves introducing a smaller amount of training data at each training step.

The sequence of training steps is associated with a first learning rate. Subsequent training steps may use the same training data and/or may introduce additional training data to train neural network 606.

As neural network 606 undergoes multiple training steps it is expected that there will be a rate of change of training errors. It is anticipated that this rate of change will change over multiple training steps. Neural network 606 is determined to be trained when a decrease in the rate of change of training errors is no longer observed, or when the training errors cannot be reduced further.

Determining 506 a rate of change of training errors may include for example comparing the error data obtained from a training step with the error data obtained from an immediately prior training step. Alternatively determining 506 a rate of change of training errors may include comparing the error data obtained from a training step with error data obtained from multiple previous training steps.

In an embodiment the rate of change of training errors may be analyzed 508. A check 510 is made to determine whether or not a stopping condition is satisfied. For example, the error data and/or the rate of change of error data may be compared against a stopping threshold value. A group of two or more error values that decrease by more than a predetermined rate threshold can be identified. At this point, the change in parameters that resulted in the error values decreasing by more than the rate threshold are identified. Where the errors arising from training states indicate convergence the training process may be determined as completed.

The observed rate of change of training errors is compared 512 against a threshold. If the rate of change remains above a threshold then the neural network undergoes the next training step at the same first learning rate indicated at 504.

On the other hand, if the observed rate of change of training errors falls below a threshold then the neural network undergoes a further training step. However, a second learning rate of subsequent training steps is determined, where the second learning rate is different to the first rate.

In an embodiment the second learning rate is lower or smaller than the first learning rate. In this way the learning rate over time can be decreased in response to a decrease in the rate of change of error over time. The learning rate over time may also be increased in response to an increase in the rate of change of error over time.

In an embodiment, the second learning rate over time is increased from the first learning rate if the rate of change of error is observed to be decreasing. In an example, a coarse set of error data has no change in rate of error in a range of training steps. This may indicate that the rate of change of errors may not be any lower in the range of training steps. In this case, a higher or larger second learning rate may be used in the same range of training steps to determine whether there is any further decreasing change of errors within the range of training steps with errors that initially did not decrease further.

In an embodiment, the first learning rate and the second learning rate are two examples of learning rates. In an embodiment a learning rate is selected from a group comprising more than two learning rates. In an embodiment a learning rate is raised or lowered depending on a currently observed rate of change of error.

Method 500 includes receiving 514 error data obtained from the second learning rate.

In an embodiment, an initial training setting of one type of member of the animation version of the physical object is employed to set an initial state of training for another type of member of the animated version of the physical object. In an example, the initial training setting for a neural network associated with an arm may be used to train a neural network associated with a leg. If the rate of change of coarse training errors for the arm neural network is similar to the leg neural network in a certain range, an increased second learning rate may be used for training the leg neural network using the neural network for an arm within that range. In other words, if a pose of an arm and a similar pose of a leg have control points in similar respective positions, a trained neural network for one type of member can be used for the other type of member.

FIG. 6 shows an example of a system 600 for training a neural network using, for example, method 500 (see FIG. 5).

As described above, training data 602 may include a first set of training data derived from image capture poses of a physical object. The training data may also include a second set of training data derived from posing an animation version of the physical object.

Input module 604 is configured to obtain training sets of data from the training data 602 and input training sets to neural network 606. In an embodiment the training sets include forward kinematic data derived from image capture poses of a physical object. In an embodiment the training sets include forward kinematic data derived from posing an animation version of the physical object.

Neural network 606 includes a plurality of layers, each layer comprising a plurality of neurons. In an embodiment, neural network 606 comprises 16 layers, each layer having 8-16 neurons per layer. Outputs from neural network 606 are compared against targets. Errors arising from differences between observed outputs and target outputs may be used to adjust, update or change connection weights within neural network 606 for training purposes. As described above, a training step may include inputting training sets to neural network 606, comparing the errors arising from differences between observed inputs and target outputs, and changing the connection weights.

As described above, updating the connection weights may include determining a direction to move the connection weights that will decrease the error arising from a difference between an observed input and a target output. This direction is also referred to as a downhill direction or gradient descent. Updating the connection weights further includes moving some distance in the downhill direction. A learning rate is associated with how far in the downhill direction the connection weights are moved.

error value module 608 receives the errors generated by neural network 606. As described above, error value module determines a rate of change of training errors associated with the errors generated by neural network 606.

The rate of change of errors is passed to training rate module 610 which checks the rate of change of errors against a threshold as described above. Training rate module 610 is configured to vary the learning rate based at least partly on the slope of the rate of change.

Figure 9:
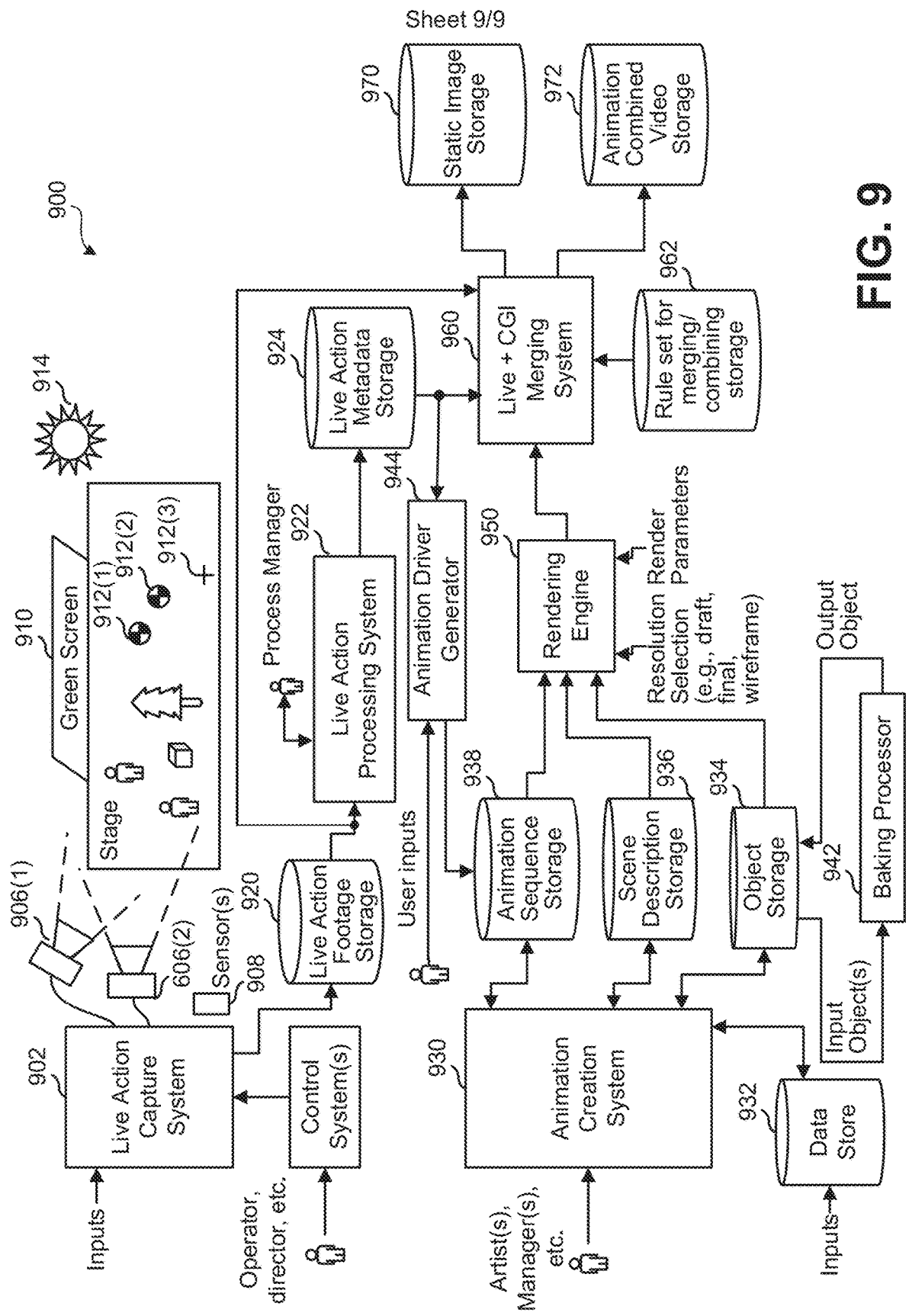
FIG. 9 illustrates an example visual content generation system as might be used to generate imagery in the form of still images and/or video sequences of images.

Once trained, neural network 606 may be used by animation driver generator 944 (see FIG. 9). In an embodiment, animation driver generator 944 is configured to read in live action metadata and generate corresponding animation parameters for use in animating an object. The animation driver generator 944 is able to convert movement data associated with a live actor into specifications of how joints of an articulated character are to move over time.

Figure 7A:
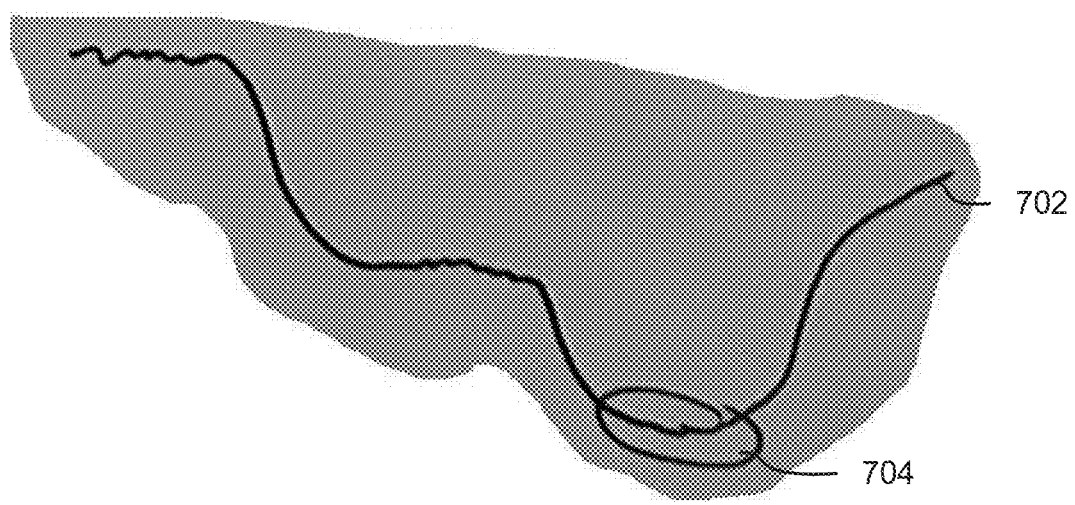
FIG. 7A and FIG. 7B show examples of plots of training steps relative to training error.
Figure 7B:
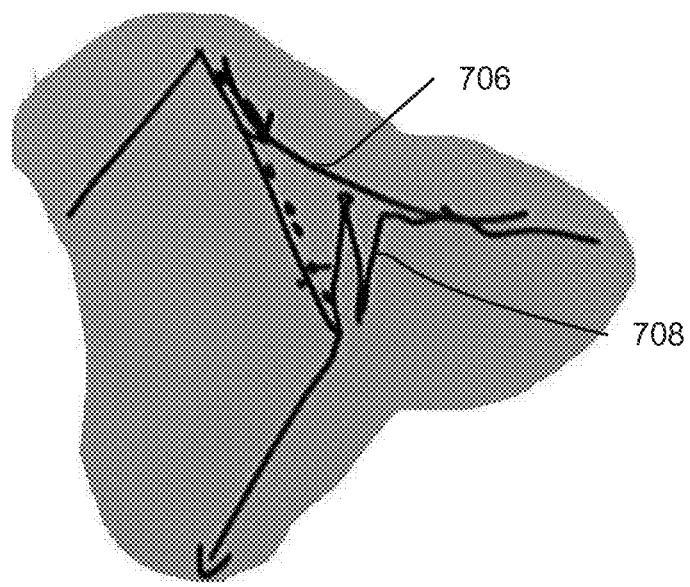

FIG. 7A and FIG. 7B show examples of plots of training steps relative to training error.

FIG. 7A illustrates plot 702 of machine learning iterations varying in a parameter in the x axis, versus a degree of error varying in the y axis, where errors increase in the vertical direction. Thus, plot 702 has a portion 704 that shows the lowest training error (i.e., best training) over successive training cycles.

FIG. 7B shows an enlargement of the section 704 of FIG. 7A. As illustrated in FIG. 7B, training steps A, B and C that were tested in a first cycle may be too coarse to pick up a more rapid change in training error as shown by untested steps A2, A3, A4, A5, B2, B3. Thus, a plot in training error 706 according to the coarse steps will miss lower training error steps that are revealed by finer training stepping.

One way to detect such situations using the coarse stepping plot is to detect steps at which the plot slope is greater than a threshold value. In FIG. 7B, point A has a relatively steep slope, as shown by arrow 710. This can be an indication of training "momentum"—that the training trajectory may be proceeding quickly downward and finer step investigations made in this vicinity could reveal lower error values. Thus, in one implementation, training steps may be adjusted depending on the rate of change of the training error in order to detect rapid changes in training errors. In an embodiment, such error detection allows method 500 (see FIG. 5), for example, to take a 'snapshot' of the error data to pick a new starting point for neural network 606 (see FIG. 6). In an embodiment the snapshot of the error data further includes at least some of the connection weights within neural network 606. In an embodiment the snapshot is used with a different learning rate.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 8:
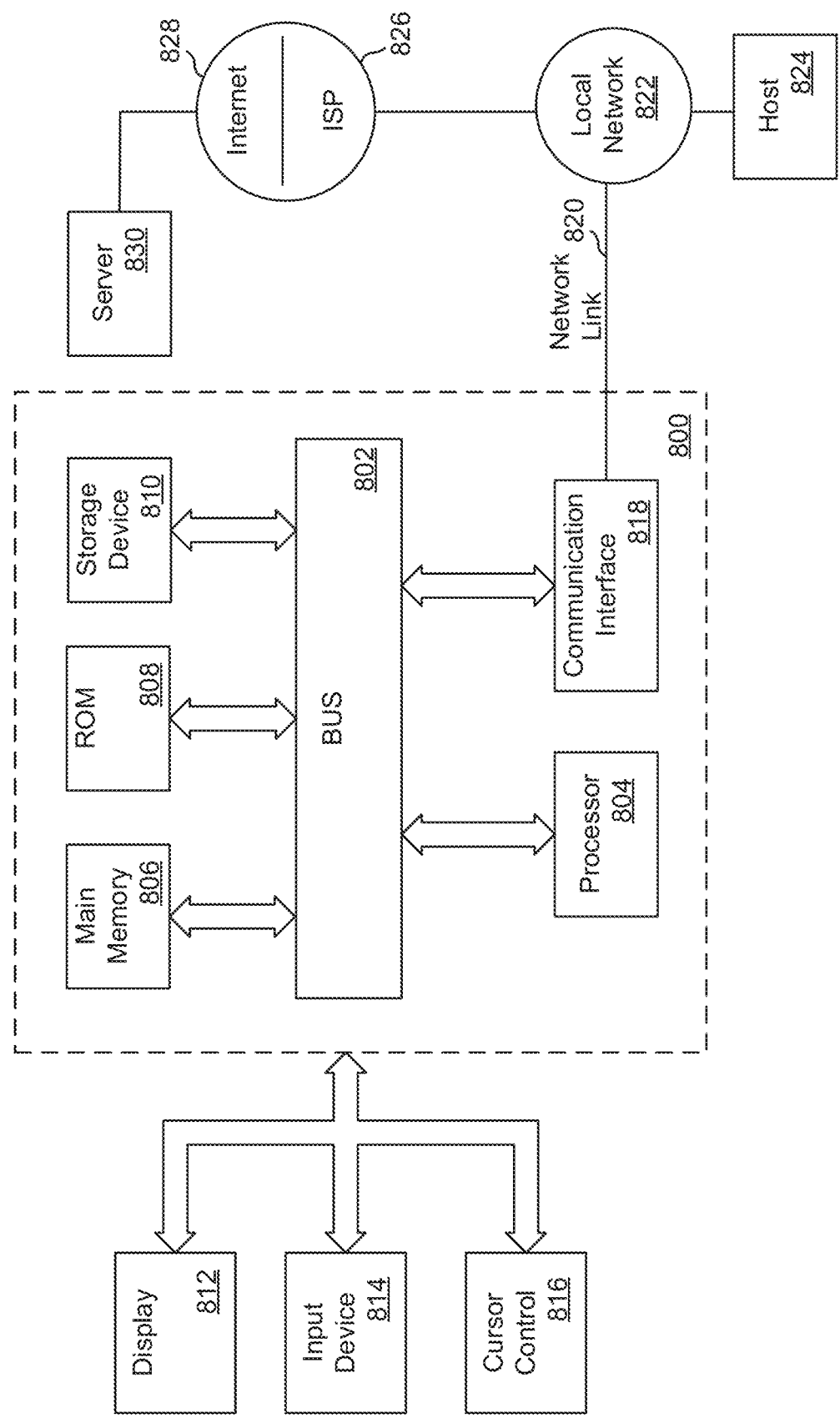
FIG. 8 is a block diagram illustrating an example computer system upon which computer systems of the systems illustrated herein may be implemented.

For example, FIG. 8 is a block diagram that illustrates computer system 800 upon which visual content generation system 900 (see FIG. 9) may be implemented. Computer system 800 includes bus 802 or other communication mechanism for communicating information, and processor 804 coupled with bus 802 for processing information. Processor 804 may be, for example, a general purpose microprocessor.

The computer system 800 also includes main memory 806, such as a random access memory (RAM) or other dynamic storage device, coupled to bus 802 for storing information and instructions to be executed by the processor 804. The main memory 806 may also be used for storing temporary variables or other intermediate information during execution of instructions to be executed by the processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

The computer system 800 may be coupled via the bus 802 to a display 812, such as a computer monitor, for displaying information to a computer user. An input device 814, including alphanumeric and other keys, is coupled to the bus 802 for communicating information and command selections to the processor 804. Another type of user input device is a cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement the techniques described herein using customized hard-wired logic, one or more ASICs or FPGAs, firmware and/or program logic which in combination with the computer system causes or programs the computer system 800 to be a special-purpose machine. According to one embodiment, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 810. Volatile media includes dynamic memory, such as the main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 802. Transmission media can also take the form of acoustic or light waves, such as those generated during radio-wave and infra-red data communications.

Various forms of media may be involved in carrying one or more sequences of one or more instructions to the processor 804 for execution. For example, the instructions may initially be carried on a magnetic disk or solid state drive of a remote computer. The remote computer can load the instructions into its dynamic memory and send the instructions over a network connection. A modem or network interface local to the computer system 800 can receive the data. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 918, which carry the digital data to and from the computer system 900, are example forms of transmission media.

The computer system 900 can send messages and receive data, including program code, through the network(s), the network link 920, and communication interface 918. In the Internet example, a server 930 might transmit a requested code for an application program through the Internet 928, ISP 926, local network 922, and communication interface 918. The received code may be executed by the processor 804 as it is received, and/or stored in the storage device 810, or other non-volatile storage for later execution.

For example, FIG. 9 illustrates the example visual content generation system 900 as might be used to generate imagery in the form of still images and/or video sequences of images. The visual content generation system 900 might generate imagery of live action scenes, computer generated scenes, or a combination thereof. In a practical system, users are provided with tools that allow them to specify, at high levels and low levels where necessary, what is to go into that imagery. For example, a user might be an animation artist who uses the visual content generation system 900 to capture interaction between two human actors performing live on a sound stage. The user could replace one of the human actors with a computer-generated anthropomorphic non-human being that behaves in ways that mimic the replaced human actor's movements and mannerisms, and then add in a third computer-generated character, and background scene elements that are computer-generated, all in order to tell a desired story or generate desired imagery.

Still images that are output by the visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., the artist 142 illustrated in FIG. 1) might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 9, a live action capture system 902 captures a live scene that plays out on a stage 904. The live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On the stage 904, there might be human actors, animal actors, inanimate objects, background objects, and possibly an object such as a green screen 910 that is designed to be captured in a live scene recording in such a way that it is easily overlaid with computer-generated imagery. The stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, the live action capture system 902 might output live action footage to a live action footage storage 920. A live action processing system 922 might process live action footage to generate data about that live action footage and store that data into a live action metadata storage 924. The live action processing system 922 might include computer processing capabilities, image processing capabilities, one or more processors, program code storage for storing program instructions executable by the one or more processors, as well as user input devices and user output devices, not all of which are shown. The live action processing system 922 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of the overhead light 914, as that might be useful in post-processing to match computer-generated lighting on objects that are computer-generated and overlaid on the live action footage. The live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of the visual content generation system 900. The animation creation system 930 might include computer processing capabilities, image processing capabilities, one or more processors, program code storage for storing program instructions executable by the one or more processors, as well as user input devices and user output devices, not all of which are shown. The animation creation system 930 might be used by animation artists, managers, and others to specify details, perhaps programmatically and/or interactively, of imagery to be generated. From user input and data from a database or other data source, indicated as a data store 932, the animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 930 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 932 might be used to drive object presentation. For example, if an artist is creating an animation of a spaceship passing over the surface of the Earth, instead of manually drawing or specifying a coastline, the artist might specify that the animation creation system 930 is to read data from the data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, X2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene, and generate corresponding animation parameters to be stored in the animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 922. The animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 950 might include computer processing capabilities, image processing capabilities, one or more processors, program code storage for storing program instructions executable by the one or more processors, as well as user input devices and user output devices, not all of which are shown.

The visual content generation system 900 can also include a merging system 960 that merges live footage with animated content. The live footage might be obtained and input by reading from the live action footage storage 920 to obtain live action footage, by reading from the live action metadata storage 924 to obtain details such as presumed segmentation in captured images segmenting objects in a live action scene from their background (perhaps aided by the fact that the green screen 910 was part of the live action scene), and by obtaining CGI imagery from the rendering engine 950.

A merging system 960 might also read data from a rulesets for merging/combining storage 962. A very simple example of a rule in a ruleset might be "obtain a full image including a two-dimensional pixel array from live footage, obtain a full image including a two-dimensional pixel array from the rendering engine 950, and output an image where each pixel is a corresponding pixel from the rendering engine 950 when the corresponding pixel in the live footage is a specific color of green, otherwise output a pixel value from the corresponding pixel in the live footage."

The merging system 960 might include computer processing capabilities, image processing capabilities, one or more processors, program code storage for storing program instructions executable by the one or more processors, as well as user input devices and user output devices, not all of which are shown. The merging system 960 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 960, such as modifying boundaries of segmented objects, inserting blurs to smooth out imperfections, or adding other effects. Based on its inputs, the merging system 960 can output an image to be stored in a static image storage 970 and/or a sequence of images in the form of video to be stored in an animated/combined video storage 972.

Thus, as described, the visual content generation system 900 can be used to generate video that combines live action with computer-generated animation using various components and tools, some of which are described in more detail herein. While the visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for training a computer system to use motion capture data to animate an animation control rig describing a model in a plurality of poses, the method comprising:
receiving training data, the training data including motion capture data associated with a target animation sequence;
selecting parameters;
generating a test animation sequence from the training data by using a matching system configured with the selected parameters;
determining an error value by comparing the test animation sequence to the target animation sequence and accumulating positional differences of corresponding components;
generating a set of error values by repeating the above selecting, generating and determining, wherein each iteration of selecting parameters varies at least one parameter by a step amount;
analyzing the set of error values to identify a group of two or more error values that decrease more than a predetermined rate threshold;

identifying parameters used to generate the identified group of error values;
using a smaller step amount to vary one or more of the identified parameters in a second sequence of selecting, generating and determining, until a lower error value is found; and
using the selected parameters corresponding to the lower error value to configure the matching system to use the motion capture data to animate the animation control rig.

2. The computer-implemented method of claim 1, further comprising:
employing an initial training setting of one type of member of the model to set an initial state of training for another type of member of the model.

3. The computer-implemented method of claim 1, wherein the training data is derived at least in part using forward kinematics.

4. The computer-implemented method of claim 1, wherein the training data is derived at least in part using inverse kinematics.

5. The computer-implemented method of claim 1, wherein determining the decrease in error values includes analyzing a rate of change of error values from an output of a neural network.

6. The computer-implemented method of claim 1, wherein the decreasing the step amount is based on a slope of a rate of change of error values.

7. An apparatus comprising:
one or more processors;
a non-transitory storage medium including instructions which, when executed by the one or more processors, implement training a computer system to use motion capture data to animate an animation control rig describing a model in a plurality of poses, the instructions comprising:
receiving training data, the training data including motion capture data associated with a target animation sequence;
selecting parameters;
generating a test animation sequence from the training data by using a matching system configured with the selected parameters;
determining an error value by comparing the test animation sequence to the target animation sequence and accumulating positional differences of corresponding components;
generating a set of error values by repeating the above selecting, generating and determining, wherein each iteration of selecting parameters varies at least one parameter by a step amount;
analyzing the set of error values to identify a group of two or more error values that decrease more than a predetermined rate threshold;
identifying parameters used to generate the identified group of error values;
using a smaller step amount to vary one or more of the identified parameters in a second sequence of selecting, generating and determining, until a lower error value is found; and
using the selected parameters corresponding to the lower error value to configure the matching system to use the motion capture data to animate the animation control rig.

8. The apparatus of claim 7, the instructions further comprising:
employing an initial training setting of one type of member of the model to set an initial state of training for another type of member of the model.

9. The apparatus of claim 7, wherein the training data is derived at least in part using forward kinematics.

10. The apparatus of claim 7, wherein the training data is derived at least in part using inverse kinematics.

11. The apparatus of claim 7, wherein determining the decrease in error values includes analyzing a rate of change of error values from an output of a neural network.

12. The apparatus of claim 7, wherein the decreasing the step amount is based on a slope of a rate of change of error values.

13. A non-transitory storage medium including instructions which, when executed by one or more processors, implement training a computer system to use motion capture data to animate an animation control rig describing a model in a plurality of poses, the instructions comprising:
receiving training data, the training data including motion capture data associated with a target animation sequence;
selecting parameters;
generating a test animation sequence from the training data by using a matching system configured with the selected parameters;
determining an error value by comparing the test animation sequence to the target animation sequence and accumulating positional differences of corresponding components;
generating a set of error values by repeating the above selecting, generating and determining, wherein each iteration of selecting parameters varies at least one parameter by a step amount;
analyzing the set of error values to identify a group of two or more error values that decrease more than a predetermined rate threshold;
identifying parameters used to generate the identified group of error values;
using a smaller step amount to vary one or more of the identified parameters in a second sequence of selecting, generating and determining, until a lower error value is found; and
using the selected parameters corresponding to the lower error value to configure the matching system to use the motion capture data to animate the animation control rig.

14. The non-transitory storage medium of claim 13, the instructions further comprising:
employing an initial training setting of one type of member of the model to set an initial state of training for another type of member of the model.

15. The non-transitory storage medium of claim 13, wherein the training data is derived at least in part using forward kinematics.

16. The non-transitory storage medium of claim 13, wherein the training data is derived at least in part using inverse kinematics.

17. The non-transitory storage medium of claim 13, wherein determining the decrease in error values includes analyzing a rate of change of error values from an output of a neural network.

18. The non-transitory storage medium of claim 13, wherein the decreasing the step amount is based on a slope of a rate of change of error values.

* * * * *